United States Patent [19]
Martens

[11] Patent Number: 5,329,572
[45] Date of Patent: Jul. 12, 1994

[54] DIAL-UP SWITCHING AND TRANSMISSION OF BROADBAND COMMUNICATION CHANNELS THROUGH A LOCAL EXCHANGE

[75] Inventor: Gregory A. Martens, Palos Hills, Ill.

[73] Assignee: AT&T Bell Laboratories, Murray Hill, N.J.

[21] Appl. No.: 951,494

[22] Filed: Sep. 24, 1992

[51] Int. Cl.$^5$ .......................................... H04M 11/00
[52] U.S. Cl. ........................................ 348/16; 370/50; 370/60.1; 370/110.1; 379/220; 379/229; 379/258
[58] Field of Search ...................... 370/58.1, 58.2, 58.3, 370/94.1, 60, 62, 60.1, 68.1, 110.1, 69.1, 71, 85.7, 85.9; 379/219, 220, 221, 222, 224, 225, 226, 227, 229, 230, 231, 232, 233, 234, 235, 237, 240, 242, 243, 245, 246, 258, 272, 90

[56] References Cited

U.S. PATENT DOCUMENTS

| | | | |
|---|---|---|---|
| 4,704,716 | 11/1987 | Bowers et al. | 370/112 |
| 4,805,166 | 2/1989 | Ardon et al. | 370/58.1 |
| 4,811,335 | 3/1989 | van Baardwijk et al. | 370/63 |
| 4,897,867 | 1/1990 | Foster et al. | 379/246 |
| 5,008,884 | 4/1991 | Yazawal et al. | 370/58.1 |
| 5,014,206 | 5/1991 | Bales et al. | 370/58.1 |
| 5,042,062 | 8/1991 | Lee et al. | 379/54 |
| 5,063,592 | 11/1991 | Cannella et al. | 370/219 |
| 5,115,426 | 5/1992 | Spanke | 370/60 |
| 5,115,427 | 5/1992 | Johnson, Jr. et al. | 370/60 |
| 5,138,657 | 8/1992 | Colton et al. | 379/220 |
| 5,200,996 | 4/1993 | Beierle | 370/110.1 |
| 5,212,691 | 5/1993 | Hokani | 379/221 |
| 5,231,631 | 7/1993 | Buhrke et al. | 370/110.1 |

FOREIGN PATENT DOCUMENTS 0119843  3/1984  European Pat. Off. ..... H04Q 11/04

Primary Examiner—Douglas W. Olms
Assistant Examiner—Huy D. Vu
Attorney, Agent, or Firm—Charles L. Warren

[57] ABSTRACT

A telephone exchange provides dial-up switched connections for customers' broadband data terminal equipment (DTE). In response to data received over an associated narrowband channel, the exchange establishes a broadband transmission path to a broadband DTE associated with the narrowband channel. Upon receiving a number for the called party broadband DTE over the narrowband channel, the switch establishes an interoffice broadband channel for communications between the originating and destination DTE.

20 Claims, 6 Drawing Sheets

| NUMBER OF CONTROL TELEPHONE | CORRESPONDING DACS PORT ADDRESS OF T1 LINE |
|---|---|
| TEL #1 | ADR − 1 |
| TEL #2 | ADR − 2 |
| ⋮ | ⋮ |
| TEL #N | ADR − N |

*FIG. 4*

| 1B | 2B | 3B | ········ | 23B | D |
|---|---|---|---|---|---|

*FIG. 5*

| 1B | 2B | 3B | ········ | 23B | 24B |
|---|---|---|---|---|---|

*FIG. 6*

| CALLED PARTY NUMBER | CALLING PARTY NUMBER | ASSOCIATED DATA OVERHEAD |
|---|---|---|

DIAL-UP SWITCHING AND TRANSMISSION OF BROADBAND COMMUNICATION CHANNELS THROUGH A LOCAL EXCHANGE

BACKGROUND OF THE INVENTION

This invention relates generally to the switching and transmission of broadband communication channels. The invention is more specifically directed to dial-up switching of such channels upon end user demand and the transmission of such channels through an interoffice communication network.

Transmission of high bandwidth signals between different locations has been typically accomplished utilizing direct point-to-point broadband communication channels. Dedicated (non-switched) broadband communication channels are used to carry the high bandwidth signals. Examples of such applications include cable television and high speed data transmission between computers.

Point-to-point broadband communication channels have several disadvantages. Since each communication station within such a network requires a dedicated channel, it is expensive to reconfigure or modify the network especially when a user's terminal is relocated to a site not already linked to the network. Such networks suffer from a lack of flexibility and are not able to provide those users with only an occasional need of a broadband channel with a cost effective solution.

Digital access and cross-connect systems (DCS) provide a known capability for interconnecting high bandwidth transmission facilities such as DS1 and DS3 transmission links. In U.S. Pat. No. 5,042,062 a plurality of DCS are connected to each other to provide communication links between broadband service users. In that system, local exchanges in response to a customer request control associated DCS to connect broadband terminals over broadband channels directly coupling the DCS.

There exists a need for a flexible broadband communication facility which permits dial-up broadband channels to be handled by the public switched telephone network (PSTN).

SUMMARY OF THE INVENTION

It is an object of the present invention to satisfy the need for a flexible broadband communication facility which permits dial-up broadband channels to be connected through the PSTN.

In accordance with an embodiment of the present invention, broadband user equipment such as video terminals are connected via DCS to a local central office exchange. Separate data terminal equipment (DTE) such as an ISDN telephone is associated with each broadband terminal and is coupled by a narrowband channel to the local exchange. A database in the local exchange stores the number of each such telephone and the corresponding port address on the DCS to which the associated broadband terminal is connected. A control channel between the local exchange and the coupled DCS enables the exchange, in response to a broadband channel request entered over the telephone by a user, to cause the DCS to connect the user's corresponding broadband terminal via broadband lines to the exchange.

A user enters the number of another broadband terminal to which communications is desired using the telephone associated with the user's broadband terminal. Utilizing a predetermined D channel (which carries signaling) of an ISDN PRI circuit, the local exchange generates a data packet containing the number of the called party's terminal, number of the calling party's terminal, address of another T1 circuit to be utilized to carry the broadband communications, and overhead data associated with the packet. This information is transmitted over the interoffice network to the local exchange to which the called party is connected. The called party's local exchange utilizes a database associated with the called party number to identify the port at the associated DCS to which the called party's broadband terminal is connected. Assuming paths between the calling party's broadband terminal and the called party's broadband terminal are available, a broadband call is established between the calling and called party's exchanges.

Another advantage of the present invention allows T1 users to be connected with integrated services digital network (ISDN) primary rate interface (PRI) users. This interoperability is provided because the normally allocated signaling channel (D) of a conventional ISDN PRI is no longer needed to carry signaling and can be utilized as a conventional B (user traffic) channel thereby providing sufficient bandwidth to be compatible with a T1 circuit.

BRIEF DESCRIPTION OF THE DRAWINGS

FIG. 4 is a table which stores and correlates telephone numbers of users' broadband terminals and the terminating DCS port of the corresponding terminals.

FIG. 5 illustrates the data format of a conventional ISDN PRI circuit.

FIG. 6 illustrates the data format of a conventional T1 circuit.

FIG. 7 illustrates signaling transmitted over the interoffice network in accordance with the present invention.

DETAILED DESCRIPTION

Figure 1:
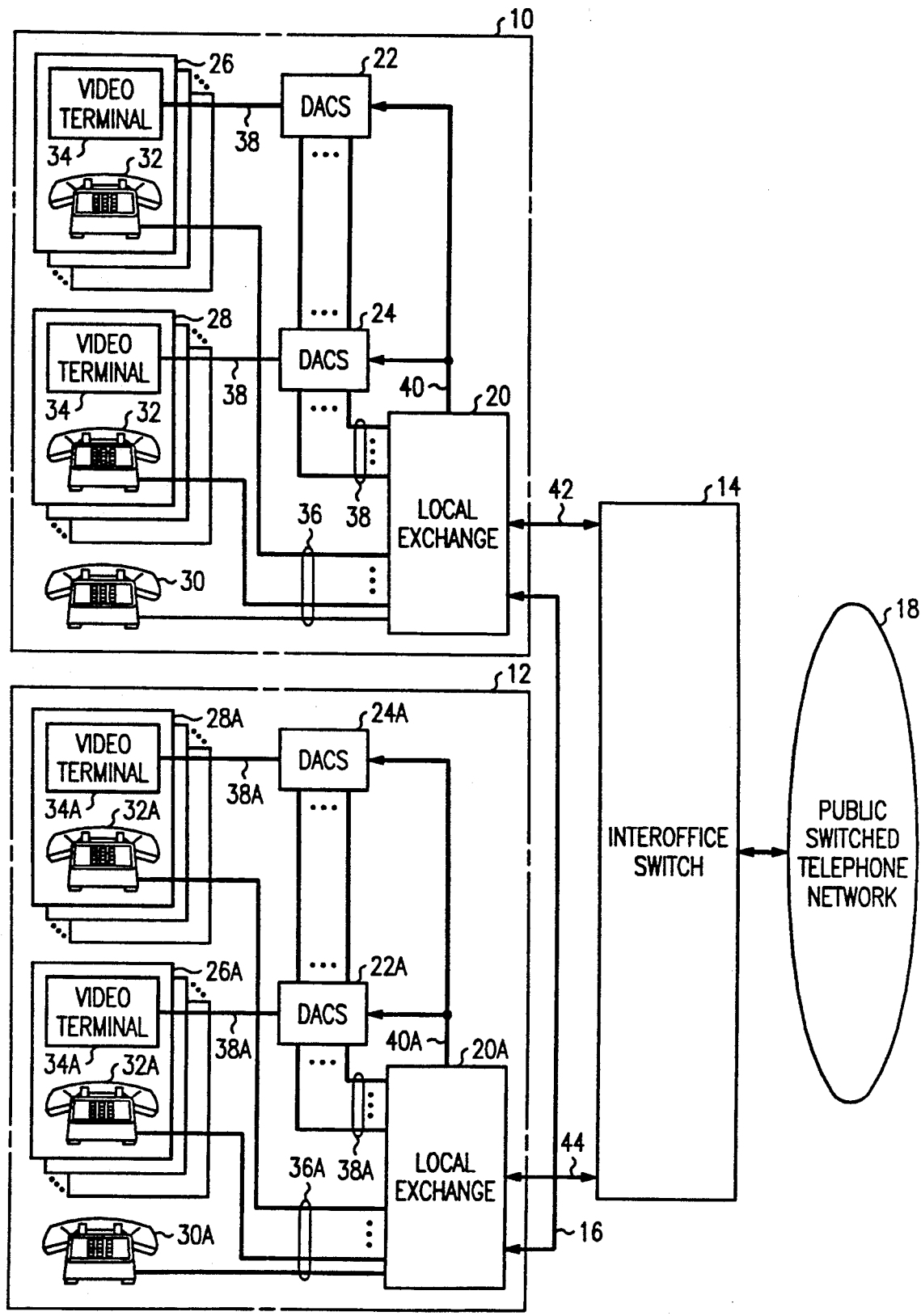
FIG. 1 is a block diagram of a communication system which incorporates an embodiment of the present invention.

Referring to FIG. 1, a switching system 10 is coupled to a separate switching system 12 by an interoffice network including interoffice switch 14 and direct trunk lines 16. The switching systems are also coupled to other switching systems via the public switched telephone network 18.

The switching system 10 includes a local central office exchange 20 which is connected to and supports broadband switching devices 22 and 24 such as digital access and cross-connect systems (DCS), equipment located at customer locations 26 and 28, and telephones 30. In the illustrative embodiment, each customer location contains a telephone 32 and a broadband communication device 34 such as a video terminal. Telephones 30 and 32 are coupled to local exchange 20 by conventional narrowband lines 36. Communication lines 38, such as T1 lines which are capable of carrying broadband signals, connect broadband equipment 34 to DCS 22 and 24 and connect the DCS to the local exchange 20. A communication line 40 which functions as a control communication channel connects local exchange 20 to DCS 22 and 24. In the illustrative example it is contemplated that a plurality of customer locations 26 and 28 will each contain broadband equipment 34 coupled, respectively, to DCS 22 and 24.

Local exchange 20 preferably consists of a digital switch such as the AT&T 5ESS ® switch. Broadband switches 22 and 24 may consist of an AT&T DACS IV digital access and cross-connect system. Broadband transmission lines 38 are capable of supporting at least DS1 (1.536 Mbps) transmission; narrowband transmission lines 36 support standard 64 kilobit channels. As used herein, the term "broadband" refers to a bandwidth capable of supporting at least a DS1 circuit. The telephones 30 and 32 may comprise an ISDN telephone utilizing the known ISDN basic rate interface for subscriber lines, or may comprise a standard telephone supported by an analog line.

The switching system 12 in this illustrative embodiment contains similarly configured elements as previously described with respect to switching system 10; the suffix letter A is added to identify corresponding elements in system 12 with the corresponding elements previously described in system 10. Interoffice transmission trunks 16, 42, and 44 each include the capacity to carry a plurality of broadband channels, narrowband channels, and data channels utilized for interoffice signaling such as CCITT signaling system 7.

In accordance with the present invention, a user at location 26 initiates a request utilizing telephone 32 to establish a dial-up broadband connection to a broadband device 34A at customer location 28A. A telephone number associated with broadband equipment 34A is entered by the customer at location 26 using telephone 32. Local exchange 20 recognizes the request for a broadband connection and uses a database stored within the local exchange to identify the port on DCS 22 to which broadband terminal 34 is coupled based on the number of telephone 32 at location 26. A control signal sent from the exchange over line 40 causes the corresponding port of DCS 22 to be activated and establishes a broadband transmission path through DCS 22 and 24 via lines 38 to local switch 20. The local exchange 20 transmits a request for a broadband connection to local exchange 28 as will be described in more detail below. Local exchange 20A correlates the called broadband terminal number to a corresponding port on DCS 24A. Using control line 40A, local exchange 20A instructs DCS 22A and 24A to establish a broadband path to broadband terminal 34A at location 28A through DCS 22A and 24A via lines 38A. Thus, a broadband communication path is established between the broadband terminals over the interoffice trunk network. A detailed description of this capability is provided below.

Figure 2:
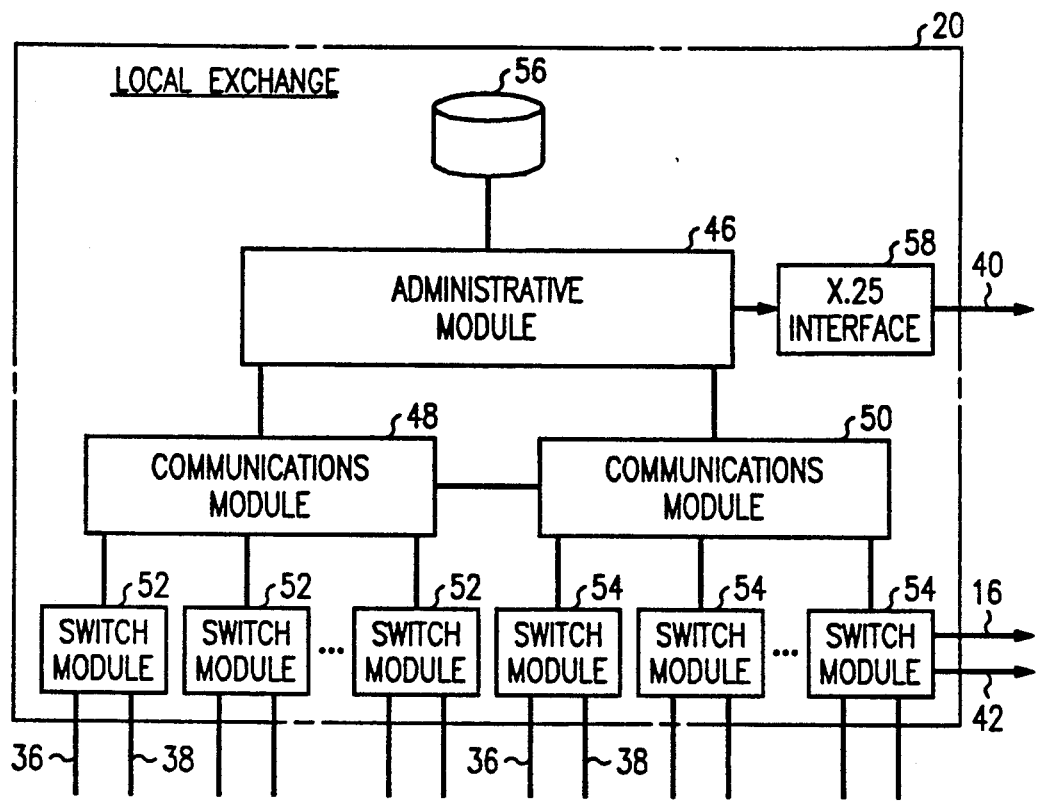
FIG. 2 is a block diagram of a local exchange as shown in FIG. 1.
Figure 3:
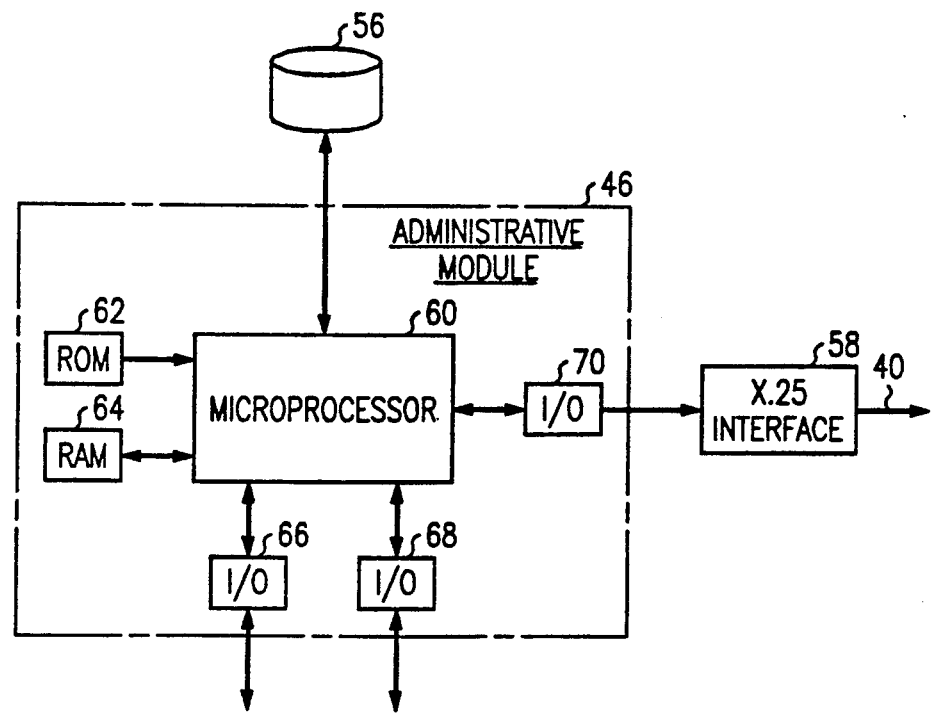
FIG. 3 is a block diagram of an administrative module as shown in FIG. 2.

FIG. 2 is a block diagram of an illustrative local exchange 20 which, in the exemplary embodiment, comprises an AT&T 5ESS switch. An administrative module 46, which will be described in more detail with respect to FIG. 3, provides control over communication modules 48 and 50 which are coupled to service modules 52 and 54, respectively. In the illustrative embodiment, each service module supports a plurality of narrowband channels 36 and broadband channels 38. The time-space-time switch configuration served by the service and communication modules is well known. A storage device 56 contains operational program instructions utilized by the administrative module 46 in controlling the local exchange. An interface 58 is utilized to provide a communication interface between administrative module 46 permitting data communications on line 40 such as utilizing the known X.25 communications protocol.

FIG. 3 is a block diagram illustrating an exemplary administration module 46 which includes a microprocessing unit (MPU) 60, read-only-memory (ROM) 62, random access memory (RAM) 64, program storage unit 56, and a plurality of input/output (I/O) devices 66, 68, and 70. Programs stored in device 56, ROM 62 and RAM 64, enables MPU 60 to exercise control of the communication modules via I/O devices 66 and 68. The I/O device 70 allows MPU 60 to establish digital communications utilizing X.25 interface 58 with the DCS coupled to communication line 40.

FIG. 4 is a table illustrating information stored in local exchanges 20 and 20A. Each row of the table contains a telephone number associated with a broadband terminal and the corresponding address of the DCS port to which the corresponding broadband terminal is connected. This information is utilized by the local exchange to establish a broadband channel from the local exchange to the corresponding DCS port address of the broadband terminal associated with a requested telephone number. In the switching system which originates a request for a dial-up broadband channel, the number of the narrowband line coupled to the telephone associated with the originating party's broadband terminal identifies the originating broadband terminal. In the switching system receiving a request from another switching system to establish a dial-up broadband path to a local broadband terminal, the telephone number of the called party received as data by the destination exchange identifies the corresponding DCS port in accordance with the table of FIG. 4 to which the broadband communication path is to be established. The information in this table is preferably stored prior to activation of a customer location needing broadband service.

FIG. 5 is a diagram illustrating a frame of a conventional ISDN PRI circuit which consists of 24 channels each of 64 kilobit capacity comprising 23 B channels and one D signaling channel.

FIG. 6 illustrates the diagram of a T1 circuit indicating that it consists of 24 B channels each of 64 kilobits. It will be apparent that the ISDN PRI circuit differs in that one of the 64 kilobit channels is utilized as a signaling channel. In accordance with the present invention, a D channel on one ISDN PRI circuit is utilized to provide control information for other ISDN PRI circuits permitting such ISDN PRI circuits to utilize the normal D channel as another B channel thereby, making such ISDN PRI circuits compatible with the T1 format. Thus, utilizing the D channel of one ISDN PRI circuit to provide needed control information to establish broadband channels through the interoffice network also provides the enhanced capability of providing communications between a user of a T1 circuit and a user of an ISDN PRI circuit.

FIG. 7 shows an exemplary format for information carried by the D channel of an ISDN PRI circuit utilized in accordance with the present invention to establish dial-up broadband interoffice connections. The illustrated packet transmitted over the D channel includes the called party broadband telephone number, the calling party broadband telephone number, and associated data overhead for the transmitted packet. The called party number, as mapped by the table of FIG. 4, identifies which DS1 circuit will be utilized to carry user broadband traffic over 24 B channels between users. It will be apparent that a plurality of such packets may be carried by a D channel thereby, providing information for a plurality of DS1 circuits utilized for broadband transmissions in accordance with the present invention.

Figure 8:
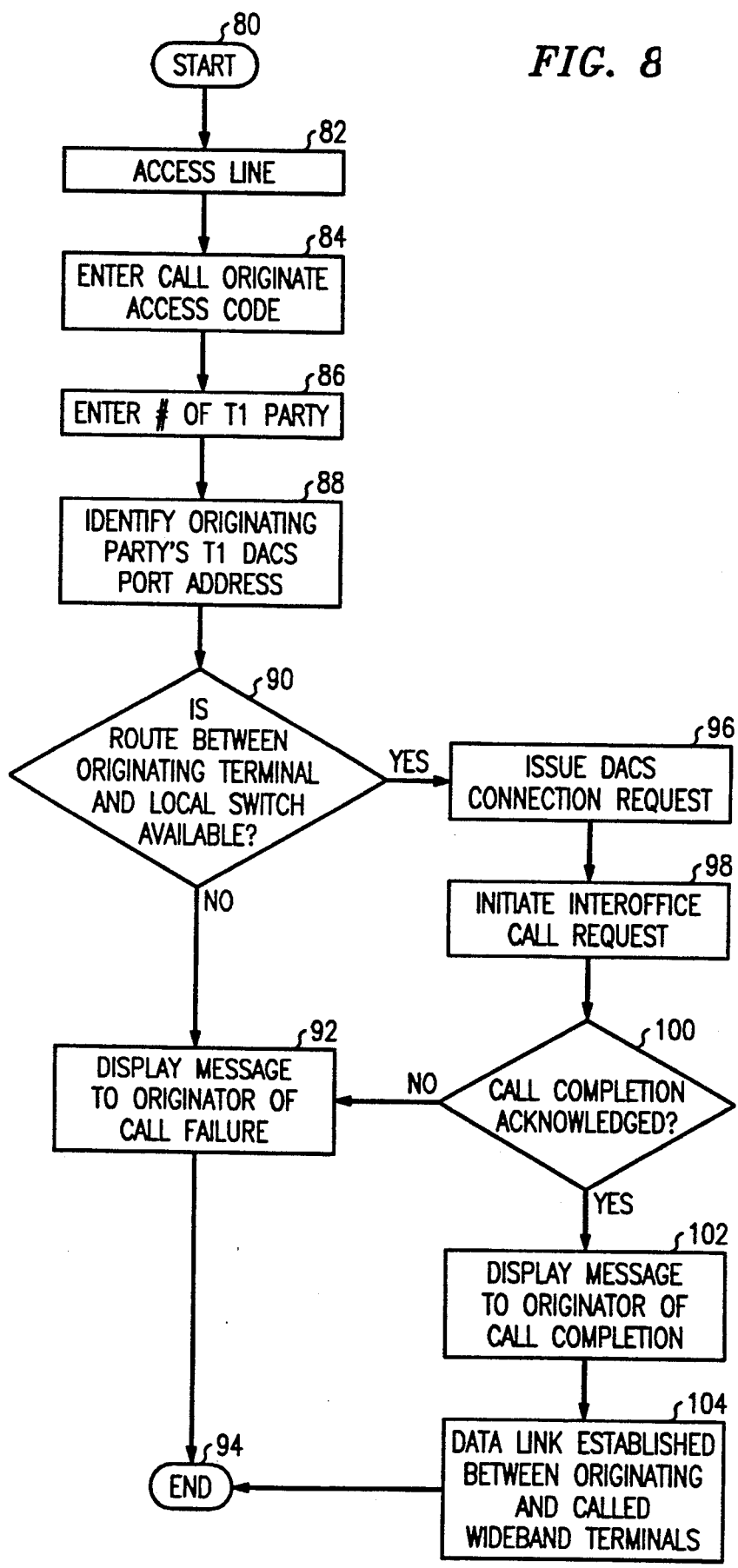
FIG. 8 is a flow diagram illustrating steps utilized for initiating a dial-up broadband call in accordance with the present invention.

FIG. 8 illustrates exemplary steps in accordance with an embodiment of the present invention for originating a request for a broadband transmission path. Beginning with START 80, a narrowband line is accessed in step 82 by a telephone 32 associated with a broadband terminal 34. Telephone 32 may comprise an ISDN basic rate telephone which accommodates data transmission to the local exchange 20. Alternatively, telephone 32 may comprise a conventional analog telephone in which access to a corresponding line is initiated by coming off-hook. In step 84 a call originate access code is entered identifying the requested service as a dial-up broadband circuit request. This access code may comprise a predetermined set of digit entries such as from a touch-tone pad if an analog telephone is utilized or a digital word sent by depressing a predefined button on an ISDN phone. In step 86 the user enters the telephone number associated with the destination broadband terminal to be called. In step 88 the local exchange 20 identifies the DCS port address of the originating party's broadband terminal based upon the associated telephone number of telephone 32 in accordance with the table of FIG. 4. In step 90 a determination is made if a route between the originating broadband terminal 34 and the local switch 20 is available. If NO, a message is sent to the originator of the call indicating a call failure as indicated in step 92. The message can be displayed if an originating ISDN telephone 32 is used or may comprise audible tones indicating a failure if a conventional analog phone is utilized. Following step 92, the origination terminates at END 94.

Following a YES determination by step 90, indicating a route is available between the originating broadband terminal 34 and the local switch 20, the local switch issues a DCS connection command as indicated in step 96. This command transmitted on line 40 identifies the DCS port to which the originating broadband terminal is connected and a path through any other connected DCS and a final broadband channel 38 connected to local exchange 20. In step 98 the local exchange initiates an interoffice call request. In step 100 a determination is made if a call completion is acknowledged by the interoffice network. A NO determination indicates the call cannot be completed and leads to steps 92 and 94 as previously explained. A YES determination by step 100 which indicates call completion, causes a message to be displayed to the originator of the call indicating call completion as indicated in step 102. This assumes that the originating party utilized an ISDN telephone; if an analog telephone is utilized, appropriate analog tone signals are utilized to provide the indication. In step 104 the broadband data link is established between the originating party's broadband terminal in the called party's broadband terminal. These steps conclude at END 94 with the dial-up broadband call in progress; teardown of the call is explained in FIG. 10.

It will be apparent to those skilled in the art that a plurality of additional steps could be utilized in addition to those shown in FIG. 8 depending upon the particular networks and systems utilized. For example, a validation check of the calling party's number could be made before permitting the call to be further processed.

Figure 9:
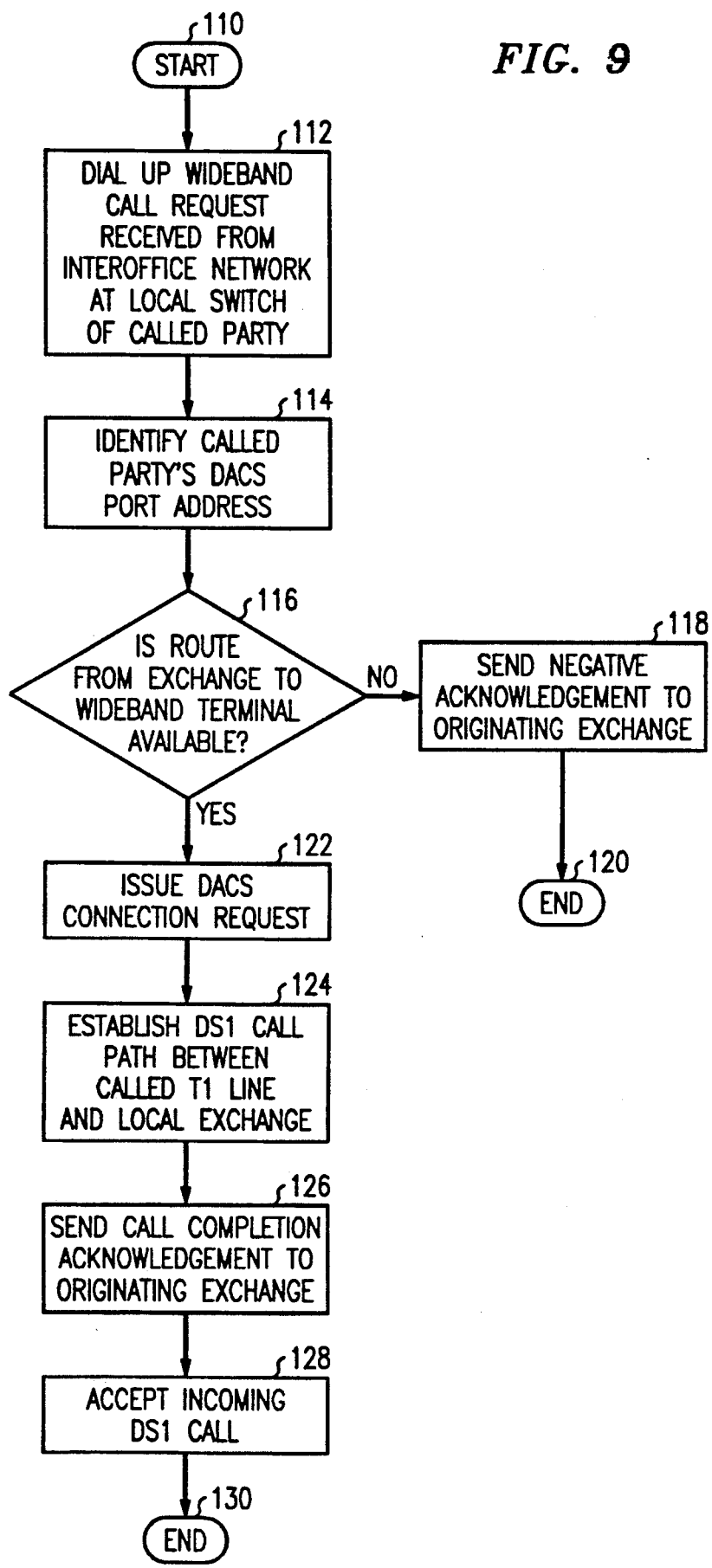
FIG. 9 is a flow diagram illustrating steps for processing a received dial-up broadband call at another local exchange in accordance with the present invention.

FIG. 9 illustrates a flow diagram in accordance with an embodiment of the present invention for a destination switching system responding to a request to establish a broadband circuit. Beginning with START 110, local exchange 20A receives a dial-up broadband call request from the interoffice network. In this example, local exchange 20A includes the broadband terminal associated with the called party number. In step 114 local exchange 20A identifies the DCS port address of the broadband terminal associated with the called number utilizing the table as described in FIG. 4. In step 116 a determination is made if a route is available from local exchange 20A to the broadband terminal 34A associated with the called number. A NO determination results in a negative acknowledgment being sent to the originating exchange over the interoffice signaling network as indicated by step 118. Next, the steps finish at END 120.

Upon a YES determination by step 116 which indicates that a route from local exchange 20A to the broadband terminal 34A is available, local exchange 20A issues a connection request to the DCS over command line 40A. This command causes the terminating DCS and any intervening DCS to establish a path between a designated broadband line 38A connected to local exchange 20A and the final terminating DCS port to which the desired broadband terminal is connected. In step 124 a broadband call is established between the local exchange 20A and the T1 line connecting the broadband terminal to the DCS port. In step 126 a call completion acknowledgement is sent to the originating local exchange 20 over the interoffice signaling network. In step 128 local exchange 20A accepts the incoming broadband (DS1) call from local exchange 20 as carried by the interoffice transmission network. This completes the call processing steps at the destination exchange as indicated by END 130.

Figure 10:
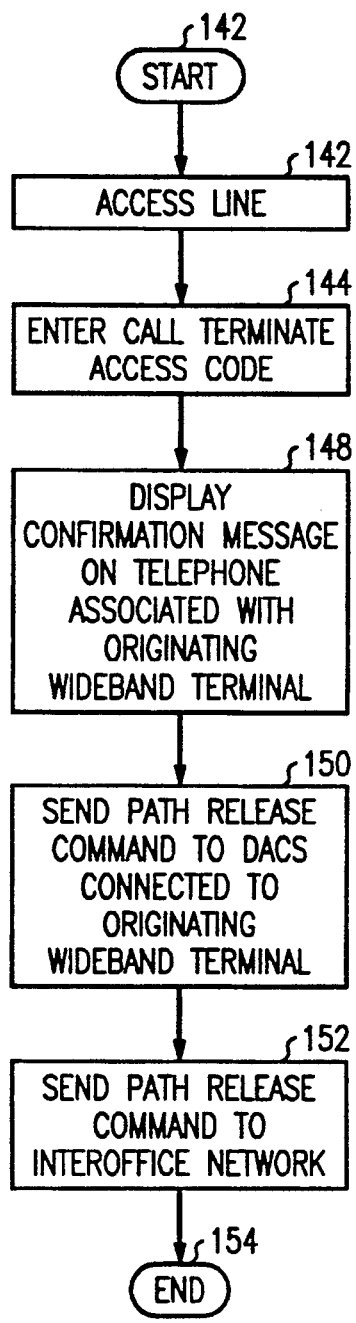
FIG. 10 is a flow diagram illustrating steps associated with tearing down a previously established dial-up broadband circuit in accordance with the present invention.

FIG. 10 is a flow diagram illustrating the termination of an established broadband call in accordance with the present invention. Beginning at START 140, the originating user of the broadband connection obtains access to a line utilizing telephone 32 which corresponds to the user's broadband terminal with the ongoing broadband communication channel. It will be noted that following the broadband call origination initiated by utilizing telephone 32, the narrowband line coupling the telephone 32 to local exchange 20 need not be maintained after the completion of the broadband connection. Thus, to initiate another request regarding the corresponding broadband terminal, the user must reaccess the line associated with telephone 32. In step 144 the user enters a predetermined access code corresponding to an instruction to the local exchange to terminate the corresponding broadband path between the originating user's broadband terminal and the called party's broadband terminal. In step 148 local exchange 20 transmits a confirmation message to the telephone 32 associated with the originating broadband terminal confirming the request for broadband call termination. This message may comprise a displayed message if telephone 32 is an ISDN telephone or predetermined audible tones if telephone 32 is a conventional analog telephone. In step 150 local exchange 20 sends path release commands to the DCS(s) through which the originating broadband terminal is connected. This causes the local path controlled by exchange 20 to be released. In step 152 local exchange 20 sends a path release command utilizing the interoffice switch network to local exchange 20A indicating that the corresponding DS1 broadband path should be released. Upon receiving the path release command, local exchange 20A will release the previously established broadband connection through the DCS(s) associated with the called party number. The path release steps terminates at END 154.

A similar broadband call termination process can be initiated by the corresponding telephone 32A of the called party broadband terminal 34A.

Because 24 B channels can be utilized for user communications over an ISDN PRI circuit in accordance with the present invention, communications between T1 users and ISDN PRI users are possible. This adds flexibility with regard to communications between such users.

The present invention also eliminates the need for direct point-to-point communication paths in order to utilize broadband communications. The ability to utilize real-time dial-up broadband circuits maximizes communication capabilities between broadband users without requiring dedicated, high cost, fixed communication paths.

Although an embodiment of the present invention has been described and illustrated in the drawings, the scope of the invention is defined by the claims which follow.

I claim:

1. A telephone exchange for providing broadband dial-up switched connections for broadband customer data terminal equipment(DTE) comprising:
   narrowband transmission channels, broadband transmission channels, and broadband interoffice transmission channels;
   means for accepting over one of said narrowband transmission channels a request for broadband service between a customer's certain DTE and another DTE supported by another exchange;
   means, responsive to said accepting means receiving said request, for automatically controlling the establishment of a broadband connection between one of said broadband transmission channels and said certain DTE;
   means for communicating with an interoffice communications network to establish a broadband channel over one of said broadband interoffice transmission channels to said another exchange which supports said another DTE;
   means for connecting said one broadband transmission channel and said one broadband interoffice transmission channel to establish a broadband connection through the telephone exchange between said certain DTE and another DTE, thereby permitting broadband communications upon dial-up demand by a customer.

2. The exchange according to claim 1 wherein said accepting means accepts data signals sent over a narrowband dial-up channel, said data signals including a telephone number of the another DTE.

3. The exchange according to claim 1 wherein said controlling means comprises means for sending command signals to multiplexing equipment coupled to said broadband transmission channels and said certain DTE, said command signals controlling which DTE coupled to the multiplexing equipment are connected to the broadband transmission channels.

4. The exchange according to claim 3 further comprising means for storing a line location address of the multiplexing equipment of each supported DTE and a corresponding telephone number.

5. The exchange according to claim 1 wherein said communicating means comprises means for sending call establishment data via a channel in a first frame over said interoffice communications network to said another exchange, said sending means sending communications from said certain DTE to said another DTE over a second frame.

6. The exchange according to claim 5 wherein all channels in said second frame are utilized for carrying communications between said certain DTE and said another DTE.

7. In a telephone exchange having a plurality of narrowband transmission channels, broadband transmission channels, and broadband interoffice transmission channels, a method for providing broadband dial-up switched connections for broadband customer data terminal equipment (DTE) comprising the steps of:
   accepting over one of said narrowband transmission channels a request for broadband service between a customer's certain DTE and another DTE supported by another exchange;
   upon receiving a customer request for broadband service, automatically controlling the establishment of a broadband connection between one of said broadband transmission channels and said certain DTE;
   communicating with an interoffice communications network to establish a broadband channel over one of said broadband interoffice transmission channels to said another exchange which supports said another DTE;
   connecting said one broadband transmission channel and said one broadband interoffice transmission channel to establish a broadband connection through the telephone exchange between said certain DTE and another DTE, thereby permitting broadband communications upon dial-up demand by a customer.

8. The method according to claim 7 wherein said accepting step accepts data signals sent over a dial-up narrowband channel, said data signals including a telephone number of the another DTE.

9. The method according to claim 7 further comprising the step of storing a line location address of each supported DTE and a corresponding telephone number.

10. The method according to claim 7 wherein said controlling step comprises sending command signals to multiplexing equipment coupled to said broadband transmission channels and said certain DTE, said command signals controlling which DTE coupled to the multiplexing equipment are connected to the broadband transmission channels.

11. The method according to claim 7 wherein said communicating step comprises the steps of utilizing a channel in a first multichannel frame for sending call establishment data via said interoffice communications network to said another exchange, and establishing a second multichannel frame for carrying communications between said certain DTE and said another DTE.

12. The method according to claim 11 wherein all channels in said second multichannel frame can be utilized for carrying communications between said certain DTE and said another DTE.

13. A switching system that provides dial-up broadband connections for customer data terminal equipment (DTE) comprising:

a telephone exchange;

a plurality of broadband communication channels coupled to said exchange;

broadband switch coupled to said broadband communication channels and customer DTE's;

means utilized by customers for sending data over a dial-up line to said telephone exchange requesting a broadband connection from a certain DTE to another broadband DTE in another switching system;

control channel coupling said telephone exchange and broadband switch;

means responsive to said sending means for transmitting command signals over said control channel from said telephone exchange to said broadband switch, said command signals establishing a connection between one of said broadband communication channels and a certain customer DTE;

means of said exchange for communicating with an interoffice communications network to establish an interoffice broadband channel over another of said broadband communication channels to said another system which supports said another DTE;

means for connecting said one broadband transmission channel and said another broadband communication channel to establish a broadband connection through the telephone exchange between said certain DTE and another DTE, thereby permitting broadband communications upon dial-up demand by a customer.

14. The system according to claim 13 wherein said dial-up line comprises a narrowband channel.

15. The system according to claim 13 further comprising means associated with the exchange for storing an address location and telephone number for each broadband DTE, said address location corresponding to the port on the switch that the associated DTE is connected.

16. The system according to claim 13 wherein said communicating means comprises means for sending call establishment data via a channel in a first frame over said interoffice network to said another system, said sending means sending communications from said certain DTE to said another DTE over a second frame.

17. In a switching system that provides dial-up broadband connections for customer data terminal equipment (DTE), said system including a telephone exchange, a plurality of broadband communication channels coupled to said exchange, and a broadband switch coupling said channels and customer DTE's, said method comprising the steps of:

sending data from a customer to said exchange requesting a broadband connection between a certain DTE and another broadband DTE in another switching system;

responsive to said data being sent, transmitting command signals from said exchange to said broadband switch, said command signals establishing a connection between one of said broadband transmission channels and said certain customer DTE;

communicating with an interoffice communications network to establish an interoffice broadband channel from said telephone exchange to said another system which supports said another DTE;

connecting said one broadband transmission channel and said interoffice broadband channel to establish a broadband connection through the telephone exchange between said certain DTE and another DTE, thereby permitting broadband communications upon dial-up demand by a customer.

18. The method according to claim 17 wherein said sending step comprises sending said data over narrowband dial-up channel to said exchange.

19. The method according to claim 17 further comprising the step of storing an address location and telephone number for each broadband DTE, said address location corresponding to a port on the switch to which the associated DTE is connected.

20. The method according to claim 17 wherein said communicating step comprises the steps of utilizing a channel in a first frame for sending call establishment data via said interoffice network to said another system, and establishing a second frame over said interoffice network for carrying communications between said certain DTE and said another DTE.

* * * * *